G. W. DOVER.
THREAD CUTTING TOOL.
APPLICATION FILED JUNE 22, 1921.
1,413,326.
Patented Apr. 18, 1922.
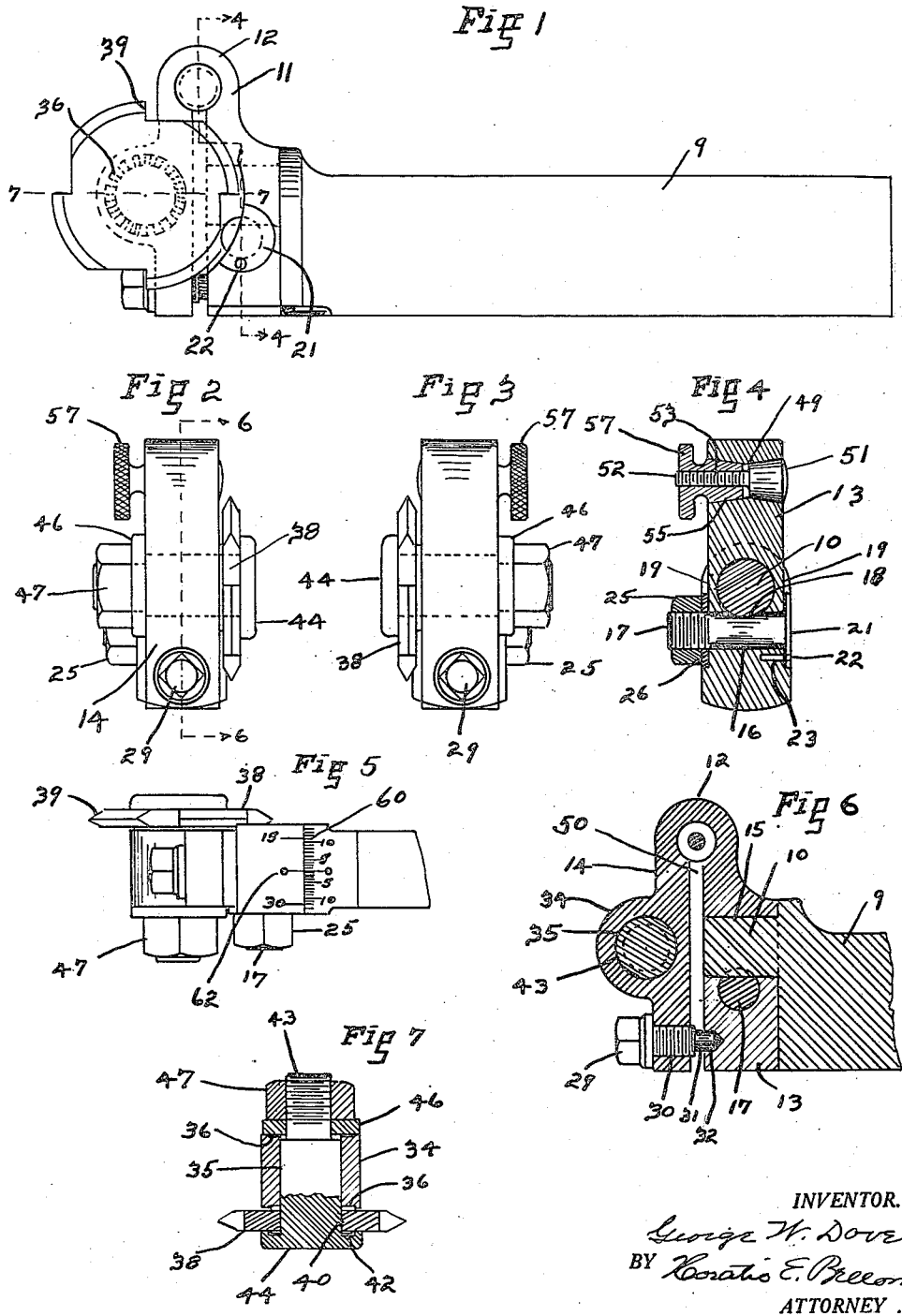
INVENTOR.
George W. Dover
BY Horatio E. Bellows
ATTORNEY.

UNITED STATES PATENT OFFICE.

GEORGE W. DOVER, OF CRANSTON, RHODE ISLAND, ASSIGNOR TO GEORGE W. DOVER, INCORPORATED, A CORPORATION OF RHODE ISLAND.

THREAD-CUTTING TOOL.

1,413,326.   Specification of Letters Patent.   Patented Apr. 18, 1922.

Application filed June 22, 1921. Serial No. 479,451.

*To all whom it may concern:*

Be it known that I, GEORGE W. DOVER, a citizen of the United States, residing at Cranston, in the county of Providence and State of Rhode Island, have invented certain new and useful Improvements in Thread-Cutting Tools, of which the following is a specification.

My invention relates to thread cutting tools and its essential objects are to adapt the construction; to cut any form of screw threads; to afford a plurality of cutting points; to enable both a deep cut and a light or finishing cut; to permit cutting at any desired angle; to afford means for securing the cutting member in any position of angular adjustment; to enable the tool to be used for both right hand and left hand cutting; and to remove the possibility of strain upon the tool during the cutting operation.

To the above ends essentially my invention consists in such parts and in such combinations of parts as fall within the scope of the appended claims.

In the accompanying drawings which form a part of this specification,

Figure 1 is a side elevation of my novel thread cutting tool,

Figures 2 and 3, end elevations of the same, showing the cutter in left and right hand positions respectively, Figure 4, a section on line 4—4 of Figure 1, Figure 5, a bottom plan view of the tool, Figure 6, a section on line 6—6 of Figure 2, and Figure 7, a section on line 7—7 of Figure 1.

Like reference characters indicate like parts throughout the views.

In the form of my invention herein illustrated 9 is a rectangular supporting bar or shank provided centrally of one end with a cylindrical stud 10. An approximately inverted U-shaped cutter holding member 11 comprises a neck portion 12, an inner arm 13, and an outer arm 14. The arm 13 is provided with a round hole 15 through which the stud 10 extends. The member 12 is rotatably movable on the stud. A hole 16 extends transversely through the portion 13 and is intercepted by the hole 15. A bolt shank 17 in this hole has a lateral concavity 18 intermediate its length to receive the member 10. Adjacent the ends of the hole 16 the sides of the member 13 have arcuate shoulders or seats 19. Upon one end of the bolt shank 17 is a head or plate 21 preferably spaced slightly from the face of the member 13. Upon the inner face of the head is a projection or pin 22 adapted to register as a sliding fit in a hole 23 on the member 13. The threaded end of the bolt projects and carries a nut 25 resting against a washer 26. By tightening the nut 25 the bolt is bound on the stud 10 whereby the tool holder may be frictionally clamped in any axial position, while the pin 23 insures that the bolt remain in proper relation to the stud 10. The outer arm 14 of the holder has a threaded opening 28 to accommodate a screw 29 having a threaded portion 30 in the opening 28, and an unthreaded end portion 31 adapted to enter a cavity 32 in the arm 13. An intermediate portion of the arm 14 has a boss 34 in which is a transverse bolt hole 35 around which on each face of the boss are radial corrugations 36. A circular cutting member 38 is provided with a series of V shaped cutting points 39, a central bolt hole 40, and radial corrugations 42 on each face around the latter. A bolt 43 in the hole 35 has a head 44 overlapping the cutting member. A washer 46 bears against the boss, and a nut 47 is screw threaded into the bolt in contact with the washer. Cutting members 38 may be substituted for each other, or locked in any adjusted position on either side of the boss 34 for either right or left hand thread cutting by tightening the nut 47.

The neck portion 12 of the cutter holder member has a transversely disposed double tapering hole 49 forming a continuation of the space 50 between the yoke arms 13 and 14. In one end of this hole is a tapering head 51 provided with a threaded stem 52 which extends through a threaded central opening 53 in a tapering nut 55 in the other end of the hole, and which terminates in a milled flange or head 57. The nut 55 may be used in conjunction with the screw 29. For heavy cutting the arm 14 and screw 29 are in the position shown in Figure 6. If cuts of less depth are desired the screw 29 is loosened to allow the arm 14 space to yield towards the base of arm 13 under the pressure of the work. The degree of this yielding of the arm 14 is, however, controlled to any desired degree by turning the nut 55. By tightening the latter more rigidity is imparted to the arm 14, giving a relatively deep cut; by loosening the nut 55 greater resiliency is permitted to the arm whereby a light or finishing cut is allowed.

The shank 9 is provided at its inner end with a series of micrometric graduations 60 cooperating with graduations 62 on the adjacent portion of the arm 13 to indicate the degrees of a circle described by the cutter holding member.

I claim:—

1. In a thread cutting tool, a shank, a stud on the shank, a cutter holding member rotatably mounted on the stud, a bolt in the member provided with a transverse channel adapted to receive the stud, and a circular cutter supported by the cutter holding member.

2. In a thread cutting tool, a shank, a stud on the shank, a cutter holding member mounted for rotatable movement on the stud and provided with a cavity, a bolt comprising a body in said member provided with a peripheral channel adapted to receive the stud, and a head, a projection on the head registerable in the cavity, a nut on the bolt, and a cutter supported by the cutter holding member.

3. In a thread cutting tool, a shank, a yoke shaped cutter holding member comprising an arm supported for rotatable adjustment by the shank and provided with a cavity, and a free arm, an adjusting screw in the free arm registerable in the cavity, and a cutter supported by the free arm.

4. In a thread cutting tool, a shank, an inverted approximately U shaped cutter holding member having inner and outer arms, the inner arm being rotatably supported by the shank at right angles thereto, a set screw on the outer arm engageable with the inner arm, the outer arm being provided with a bolt hole, radial corrugations on the outer arm surrounding the ends of the bolt hole, a circular cutter provided with a bolt hole, radial corrugations surrounding the last mentioned hole, a bolt extending through both holes, a head on the bolt engaging the cutter, a washer on the bolt, and a nut on the bolt engaging the washer for tightening the cutter.

5. In a thread cutting tool, a cutter holding member comprising a neck, an inner arm and a vibratory outer arm parallel with the inner arm and spaced therefrom, a shank supporting the inner arm at right angles thereto, a set screw in the outer arm engageable with the inner arm, a cutter rotatably mounted on an intermediate portion of the outer arm, said neck being provided with a transversely disposed double tapering hole communicating with the space between the arms, a tapering head in one end of the hole, a threaded stem on the head within the hole, and a tapering nut in the hole on the stem.

In testimony whereof I have affixed my signature.

GEORGE W. DOVER.